US012732700B2

(12) United States Patent
Baldan et al.

(10) Patent No.: US 12,732,700 B2
(45) Date of Patent: Sep. 8, 2026

(54) MULTIPLE POSITION ROLLING SHUTTER IMAGING DEVICE

(71) Applicant: Motional AD LLC, Boston, MA (US)

(72) Inventors: Giancarlo Baldan, Boston, MA (US); William Buono, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 327 days.

(21) Appl. No.: 17/806,676

(22) Filed: Jun. 13, 2022

(65) Prior Publication Data

US 2023/0403471 A1 Dec. 14, 2023

(51) Int. Cl.

*H04N 23/695* (2023.01)
*G01S 17/86* (2020.01)
*G01S 17/89* (2020.01)
*H04N 23/61* (2023.01)

(52) U.S. Cl.

CPC ........... *H04N 23/695* (2023.01); *G01S 17/86* (2020.01); *G01S 17/89* (2013.01); *H04N 23/61* (2023.01)

(58) Field of Classification Search

CPC ......... G01S 17/86; G01S 17/89; H04N 23/69; H04N 23/695; H04N 25/42; H04N 25/531; H04N 23/61

USPC .......................................................... 348/148

See application file for complete search history.

(56) References Cited

U.S. PATENT DOCUMENTS 8,521,411 B2 * 8/2013 Grabowski et al. ... G01C 21/00 701/200
10,866,313 B2 * 12/2020 Gassend et al. ...... G01S 7/4972
11,451,688 B2 * 9/2022 Benemann ......... H04N 23/6812
11,610,337 B2 * 3/2023 Habib ..................... G01S 17/89
11,734,848 B2 * 8/2023 Springer ................. G01S 17/42 701/28

(Continued)

FOREIGN PATENT DOCUMENTS

JP 2012129817 A * 7/2012
WO WO-2019079311 A1 * 4/2019 ........... H04N 23/689

OTHER PUBLICATIONS

Yu, Tian-You, Guifu Zhang, Anil B. Chalamalasetti, Richard J. Doviak, and Dusan Zrníc. "Resolution Enhancement Technique Using Range Oversampling". Journal of Atmospheric and Oceanic Technology 23.2 (2006): 228-240. https://doi.org/10.1175/JTECH1841.1 Web. (Year: 2005).*

(Continued)

*Primary Examiner* — William C Vaughn, Jr.
*Assistant Examiner* — Astewaye Gettu Zewede
(74) *Attorney, Agent, or Firm* — Knobbe, Martens, Olson & Bear, LLP

(57) ABSTRACT

Provided are systems and methods related to a multiple position rolling shutter camera. A system can include an imaging device, an actuator, a processor, and a storage media. The imaging device can be configured to capture an image within a field of view using a rolling shutter that operates in a shutter direction. The actuator can be coupled to the imaging device and configured to rotate the imaging device between a first orientation, wherein the shutter direction comprises a first direction, and a second orientation, wherein the shutter direction comprises a second direction that is different than the first direction. The instructions can, when executed by the processor, cause the processor to cause the actuator to rotate the imaging device between the first orientation and the second orientation.

12 Claims, 12 Drawing Sheets

(56) References Cited

U.S. PATENT DOCUMENTS

| | | | | |
|---|---|---|---|---|
| 2009/0128647 | A1* | 5/2009 | Fahn | H04N 23/695 348/E5.037 |
| 2020/0018854 | A1* | 1/2020 | Hicks | G01S 7/4802 |
| 2020/0327696 | A1* | 10/2020 | Habib | B64U 10/13 |
| 2021/0109205 | A1* | 4/2021 | Liao | G01S 7/4972 |
| 2022/0327719 | A1* | 10/2022 | Shaag | G01B 11/22 |
| 2022/0394156 | A1* | 12/2022 | Benemann | G06T 5/80 |
| 2024/0069172 | A1* | 2/2024 | Kapusta | G01S 7/4808 |

OTHER PUBLICATIONS

International Search Report and Written Opinion received for PCT Application No. PCT/US2023/022568, mailed Aug. 11, 2023.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

International Preliminary Report on Patentability received for PCT Application No. PCT/US2023/022568, mailed Dec. 26, 2024.

* cited by examiner

600

MULTIPLE POSITION ROLLING SHUTTER IMAGING DEVICE

BACKGROUND

The present disclosure discloses systems, methods, and computer program products relating to multiple position rolling shutter imaging devices or cameras rotatable between a first orientation and a second orientation.

SUMMARY

In one embodiment a system includes an imaging device, a connector, an actuator, at least one processor, and at least one non-transitory storage media. The imaging device is configured to capture an image within a field of view using a rolling shutter that operates in a shutter direction. The connector is coupled to the imaging device. The actuator is coupled to the connector and configured to rotate the connector and the imaging device between a first orientation, wherein the shutter direction comprises a first direction, and a second orientation, wherein the shutter direction comprises a second direction that is different than the first direction. The at least one non-transitory storage media stores instructions that, when executed by the at least one processor, cause the at least one processor to cause the actuator to rotate the imaging device between the first orientation and the second orientation based on an analysis of the image.

In another embodiment, a method includes receiving, using at least one processor, an image from an imaging device configured to capture an image within a field of view using a rolling shutter that operates in a shutter direction, wherein the imaging device is coupled to an actuator configured to move the imaging device between a first orientation, wherein the shutter direction comprises a first direction, and a second orientation, wherein the shutter direction comprises a second direction that is different than the first direction. The method also includes analyzing, using the at least one processor, the image to determine at least one image parameter. The method also includes causing, using the at least one processor, the actuator to rotate the imaging device between the first orientation and the second orientation based on the at least one image parameter.

In another embodiment, an apparatus includes an imaging device, a connector, and an actuator. The imaging device includes a field of view that is asymmetric. The field of view includes a first dimension that is less than and orthogonal to a second dimension. The imaging device is configured to capture an image within the field of view using a rolling shutter that operates in a shutter direction that is parallel to the first dimension. The connector is coupled to the imaging device. The actuator is coupled to the connector and configured to rotate the connector and the imaging device between a first orientation, wherein the first dimension is parallel to a first direction and a second orientation, wherein the first dimension is parallel to a second direction that is orthogonal to the first direction.

DETAILED DESCRIPTION

Figure 1:
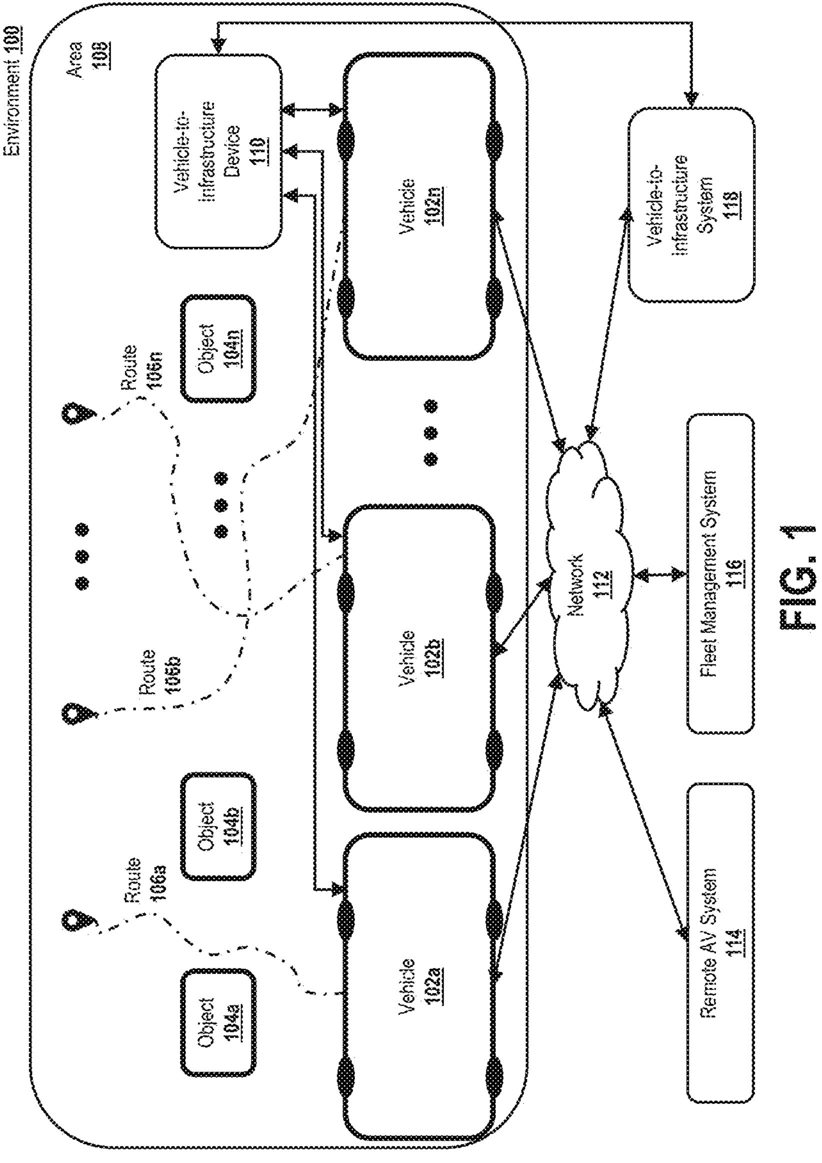
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein provide systems and methods relating to multiple position rolling shutter imaging devices or cameras. In some instances, the systems and methods described herein can rotate an imaging device between a first orientation and a second orientation. In the first orientation, a rolling shutter direction of the imaging device can comprise a first direction. In the second orientation, the rolling shutter direction can comprise a second direction that is different than the first direction. The imaging device can be rotated or otherwise moved between the first and second orientations to beneficially or advantageously maximize the field of view of the camera and/or to reduce distortion in images captured by the imaging device. Control of the orientation of the imaging device can be based on, among other things, analysis of images captured by the imaging device.

Advantages of the implementations of systems and methods described herein, include but are not limited to, the ability to move the imaging device between a first (e.g., horizontal) rolling shutter position or direction and a second (e.g., vertical) rolling shutter position or direction. This can allow for different fields of view to be captured by the same imaging device. Horizontal and vertical rolling shutter directions can offer different benefits and the ability to switch or select between the two can allow the same imaging device to offer both sets of benefits. For example, in some instances, a vertical rolling shutter position can provide a larger horizontal field of view and can be better for stereo vision, while a horizontal rolling shutter position can provide for reduced distortion when other objects are moving and the shutter direction is aligned with the rotation of the LiDAR.

Referring now to FIG. 1, illustrated is example environment 100 in which vehicles that include autonomous systems, as well as vehicles that do not, are operated. As illustrated, environment 100 includes vehicles **102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104***a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
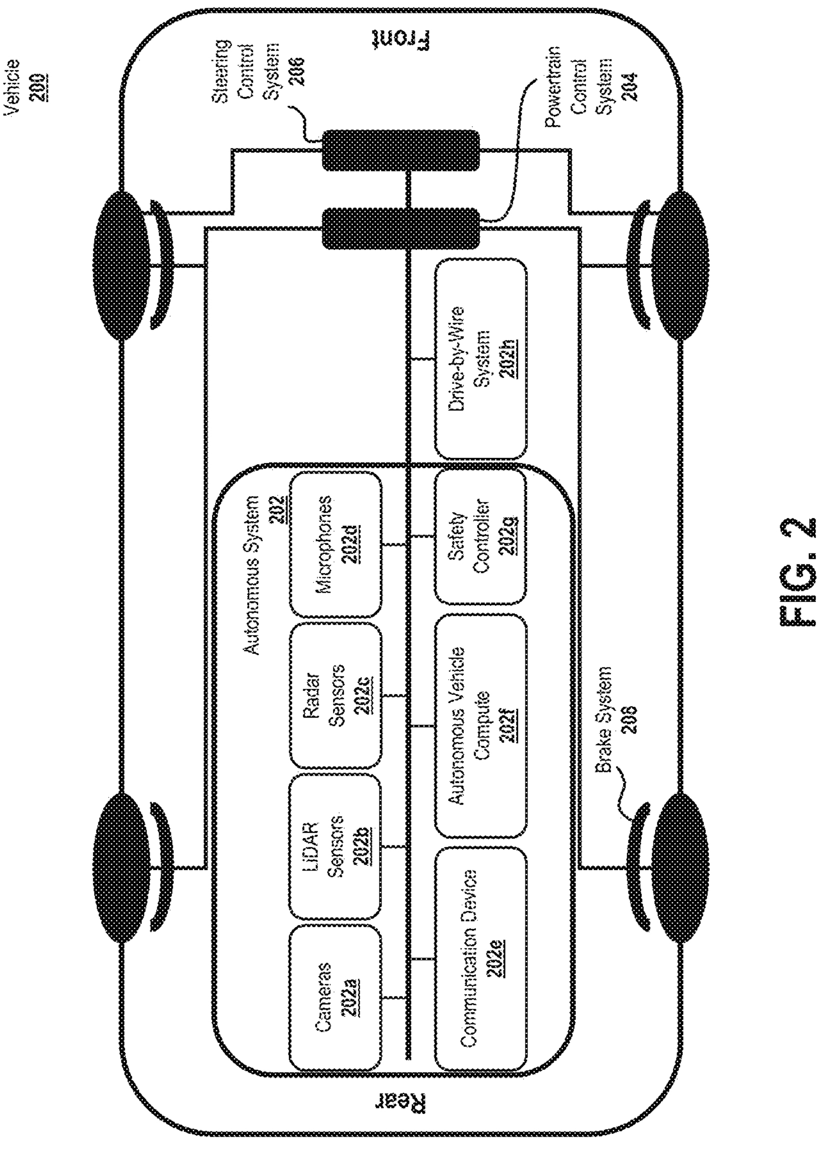
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras **202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, drive-by-wire (DBW) system 202*h*, and safety controller 202*g***.

Figure 3:
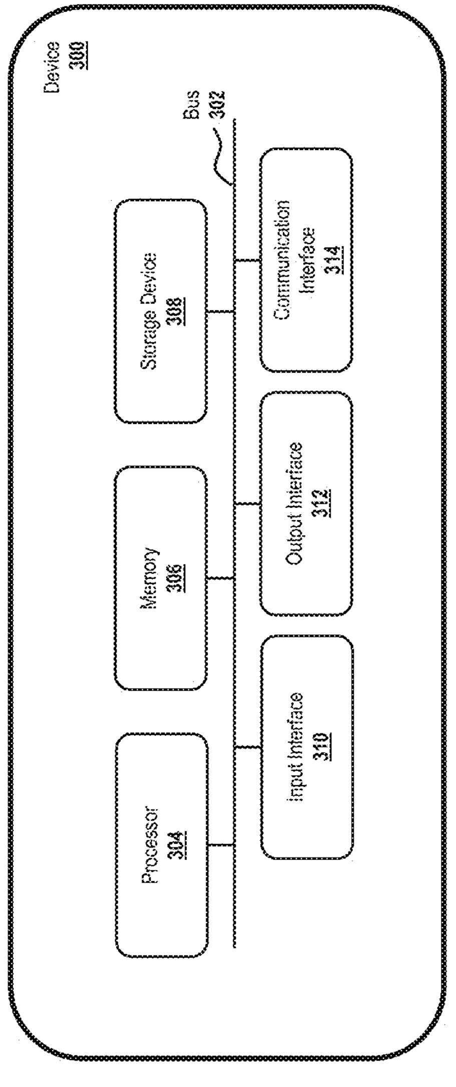
FIG. 3 is a diagram of components of one or more devices and/or one or more systems of FIGS. 1 and 2.

Cameras **202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a C harge-Coupled Device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a***.

In an embodiment, camera **202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD (Traffic Light Detection) data associated with one or more images that include a format (e.g., RAW, JPEG, PNG, and/or the like). In some embodiments, camera 202*a* that generates TLD data differs from other systems described herein incorporating cameras in that camera 202***a* can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of V2I device 110, at least one device of remote AV system 114, at least one device of fleet management system 116, at least one device of V2I system 118, at least on device of vehicle 200 (e.g., at least one device of autonomous system 202), at least one device of DBW system 202*h*, at least one device of powertrain control system 204, at least one device of steering control system 206, and/or one or more devices of network 112 (e.g., one or more devices of a system of network 112). In some embodiments, one or more devices of vehicles 102 (e.g., one or more devices of a system of vehicles 102), at least one device of V2I device 110, at least one device of remote AV system 114 at least one device of fleet management system 116, at least one device of V2I system 118, at least on device of vehicle 200 (e.g., at least one device of autonomous system 202), at least one device of DBW system 202*h*, at least one device of powertrain control system 204, at least one device of steering control system 206, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, the processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
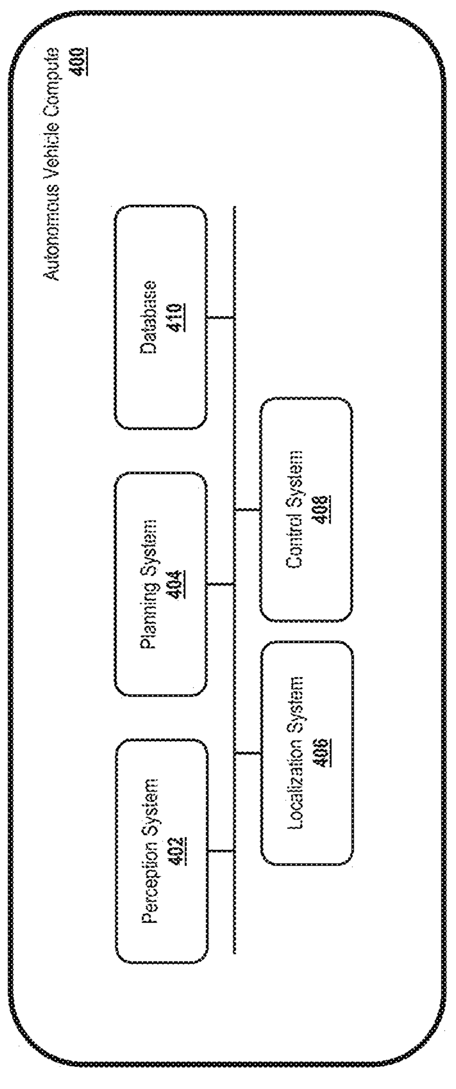
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

In an autonomous system (such as an autonomous vehicle (AV)), the positioning and/or orientation of an imaging device or camera can affect close and far range fields of view coverage. For example, most imaging devices are configured such that the horizontal field of view (HFoV) and the vertical field of view (VFoV) are different. Most commonly, the HFoV is wider than the VFoV is tall, allowing for more visibility in a horizontal direction and less visibility in a vertical direction. Stated another way, for many imaging devices the overall field of view of the imaging device can be considered rectangular, being longer in one direction than in another. In most cases, imaging devices are fixedly positioned, meaning that the corresponding field of view of the imaging device is also fixed. As described herein, however, the ability to move, rotate, select and/or switch the positioning and/or orientation of the imaging device can allow for different field coverages for both the horizontal field of view and vertical field of view. For example, for an imaging device whose HFoV is generally greater than its VFoV, rotating the imaging device about 90 degrees can allow the imaging device to capture an images with a narrower HFoV and a taller VFoV.

Rotating or otherwise moving an imaging device between different orientations may further adjust the shutter direction of a rolling shutter of the imaging device. For example, for an imaging device that generally has a vertical rolling shutter direction, rotating the imaging device 90 degrees will provide the imaging device with a horizontal rolling shutter direction. As described herein, adjusting a position or orientation of an imaging device to adjust its rolling shutter direction can be advantageous in a number of different circumstances, such as minimizing distortions in images of fast moving objects and/or improving fusion of image data from the imaging device with other forms of data, such as LiDAR data.

Throughout this description, the terms orientation and position(ing) may be used interchangeably and generally refer to the orientation or position of an imaging device such as a camera. In this description, the term normal is used to refer to an imaging device position or orientation in which the HFoV is greater than the VFoV and a rolling shutter direction of the imaging device is vertical. The terms horizontal and vertical generally refer to positions with respect to a vehicle that includes the imaging system, but these terms are used only for ease of description and should not be construed as limiting. Throughout the description, the terms an orientation 90 degrees from normal or a position(ing) 90 degrees from normal may be used interchangeably. An orientation 90 degrees from normal provides an imaging system with a horizontal rolling shutter as described in more detail below (e.g., the imaging system has been rotated such that its normally vertical rolling shutter direction now moves in a horizontal direction).

Figure 5A:
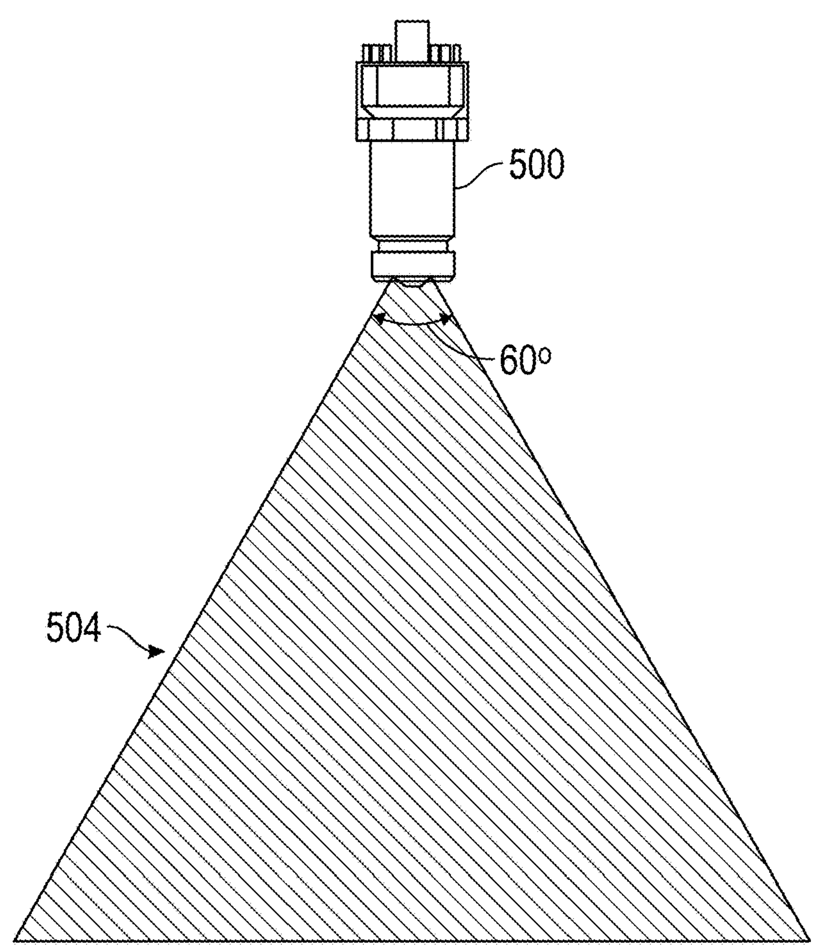
FIG. 5A is a top view of an imaging device with a representative example of a horizontal field of view.
Figure 5B:
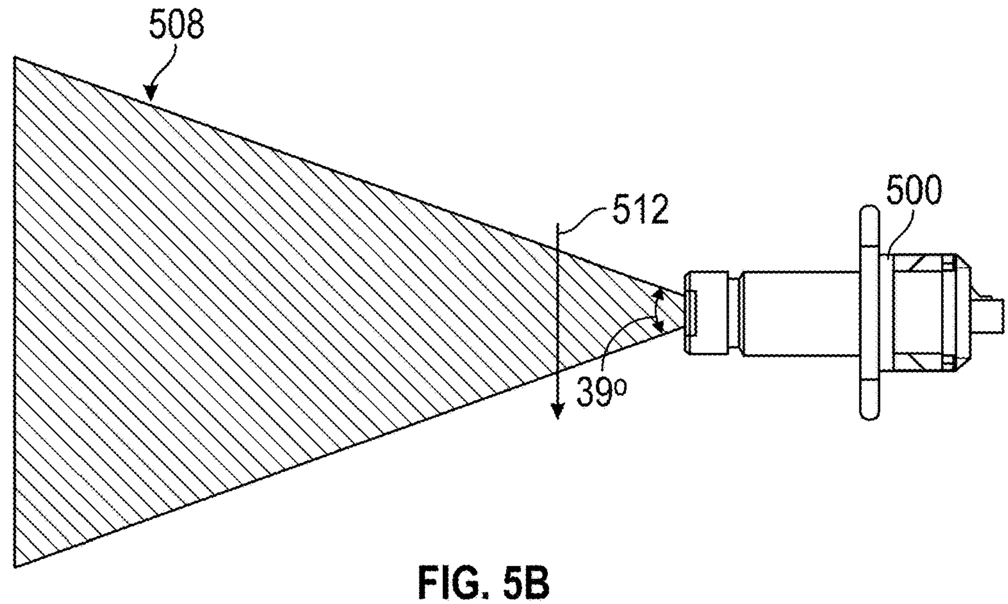
FIG. 5B is a side view of the imaging device with a representative example of a vertical field of view.

FIGS. 5A and 5B are top and side views, respectively, representative of example field of view coverages for an imaging device 500 illustrated in a normal position or orientation. FIG. 5A illustrates an example of a horizontal field of view 504 and FIG. 5B illustrates an example of a vertical field of view 508 for the imaging device 500 with the imaging device 500 positioned in a normal orientation. The example angle ranges of the fields of view shown in the figures are provided by way of example, and other imaging devices may be configured with differently ranged fields of view. As shown, the field of view of the imaging device 500 is asymmetric with the HFoV (shown in FIG. 5A) being greater than the VFoV (shown in FIG. 5B). With the imaging device provided in a normal orientation, the imaging device is oriented with a vertical rolling shutter. This means, with relation to the orientation of the figures as shown, the shutter direction moves in the direction of arrow 512 in FIG. 5B. For example, the vertical rolling shutter can capture image data from the top of the image to the bottom of the image, where the top of the image is captured slightly before the bottom of the image. The shutter direction is not shown in FIG. 5A as the arrow would be pointing into the page.

The horizontal field of view 504 and the vertical field of view 508 are asymmetric. The horizontal field of view 504 shown provides 60 degree coverage, however, the degree of coverage can vary depending on the specifics of the imaging device 500. The vertical field of view 508 shown provides 39 degrees of coverage, however, the degree of coverage can vary depending on the specifics of the imaging device 500.

As described in more detail below, the imaging device 500 can be rotated from a first position or orientation to a second position or orientation. The second position can be about 90 degrees from normal. When rotated to a position about 90 degrees from normal, the imaging device 500 will be oriented such that it operates with a rolling shutter that moves in a horizontal direction. The direction of the horizontal rolling shutter can be orthogonal to the direction of the vertical rolling shutter. As such, the shutter direction can be left to right or right to left. In some embodiments, the horizontal rolling shutter direction can align with the direction of the movement or rotation of a LiDAR device. When rotated to a position 90 degrees from normal, the coverage of the horizontal field of view and the coverage of the vertical field of view will switch (e.g., the VFoV becomes greater than the HFoV). Using FIGS. 5A and 5B as examples, with the imaging device moved to the second position (in this case, rotated to a position about 90 degrees from normal), the horizontal field of view would now have 39 degrees of coverage while the vertical field of view would now have 60 degrees of coverage.

The ability to switch or select between a horizontal rolling shutter position and a vertical rolling shutter position by physically moving the imaging device can allow for different fields of view to be captured. While there is a relationship between shutter direction and field of view and a relationship between camera orientation and field of view, shutter direction and field of view are independent of each other, meaning a horizontal rolling shutter position does not necessarily require a specific field of view nor does a vertical rolling shutter position. This can be beneficial because horizontal rolling shutters and vertical rolling shutters can offer different advantages as described herein.

Figure 6A:
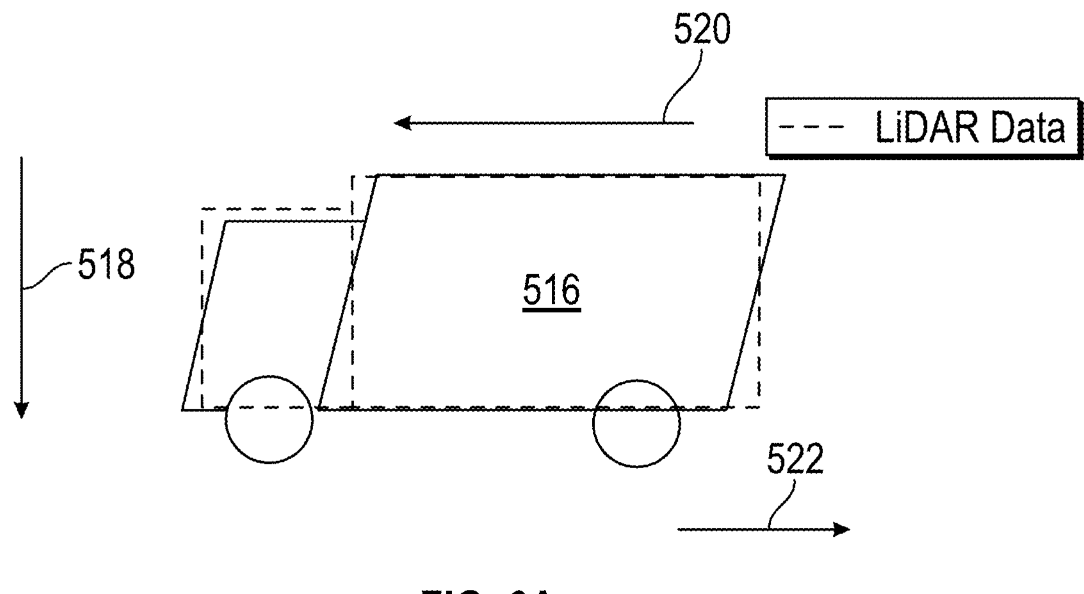
FIG. 6A is a diagram illustrating representative distortion of an image of a horizontally moving object captured using an imaging device with a vertical rolling shutter.

FIG. 6A is a diagram representative of the possible distortion of an image of a horizontally moving object 516 (for example, a vehicle) captured using an imaging device oriented with a vertical rolling shutter direction. The shutter direction is represented by arrow 518. The motion of the object 516 is represented by the arrow 520. As shown, because the object 516 is moving horizontally while the imaging device captures the image with a vertically oriented rolling shutter direction, the shape of the object is distorted, for example, appearing slanted as illustrated. This can be problematic for several reasons. For one, it does not accurately represent the real-world scene. For another, the distorted image data may not align with data captured by other sensor modalities. For example, LiDAR data (data captured by LiDAR) is illustrated in FIG. 6A with dashed lines. The LiDAR system can be configured to rotate with a direction of rotation as shown by the arrow 522. As illustrated, the LiDAR system captures undistorted data (represented by the dashed line version of the object 516). The solid outline of the object 516 is representative of the image data from the imaging device (e.g., imaging device 500). As shown, the use of a vertical rolling shutter can lead to distortion between the image from the imaging device (e.g., the solid outline) and the LiDAR data (e.g., the dashed outline).

Figure 6B:
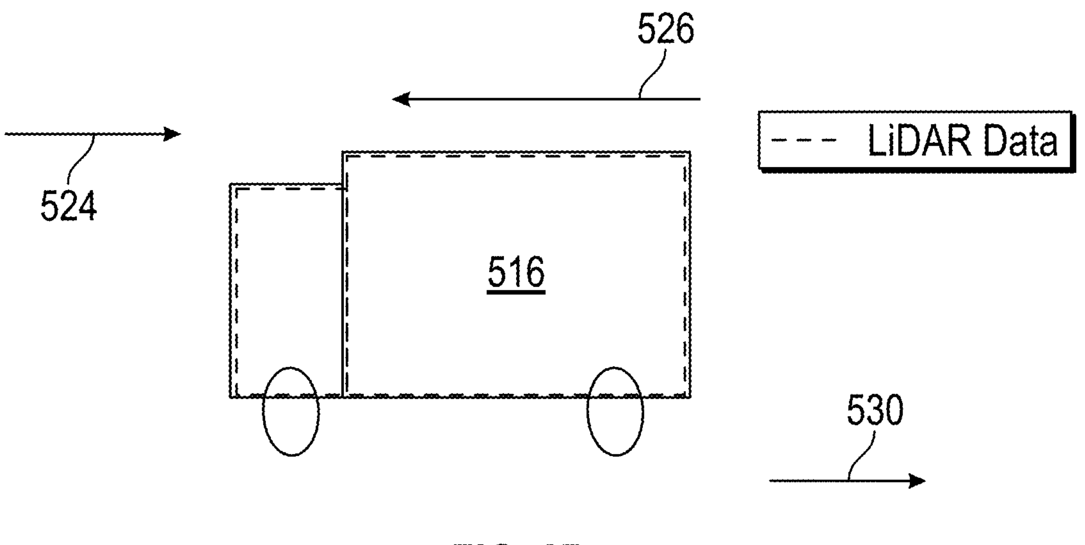
FIG. 6B is a diagram illustrating representative distortion of an image of a horizontally moving object captured using an imaging device with a horizontal rolling shutter.

FIG. 6B is representative of an image of the object 516 taken using an imaging device oriented so as to have a horizontal rolling shutter. The shutter direction is represented by arrow 524. The motion of the object 516 is represented by the arrow 526. The direction of the rotation of the LiDAR is represented by the arrow 530. The solid outline of the object 516 is representative of the image from the imaging device (e.g., imaging device 500). The dashed outline is representative of the LiDAR data. As shown, with this imaging device in this orientation, the image from the imaging device and the LiDAR data are more closely related, however they may or may not be identical. The scenarios of FIGS. 6A and 6B depict one example situation where a horizontal rolling shutter may be preferred over a vertical rolling shutter.

Figure 7A:
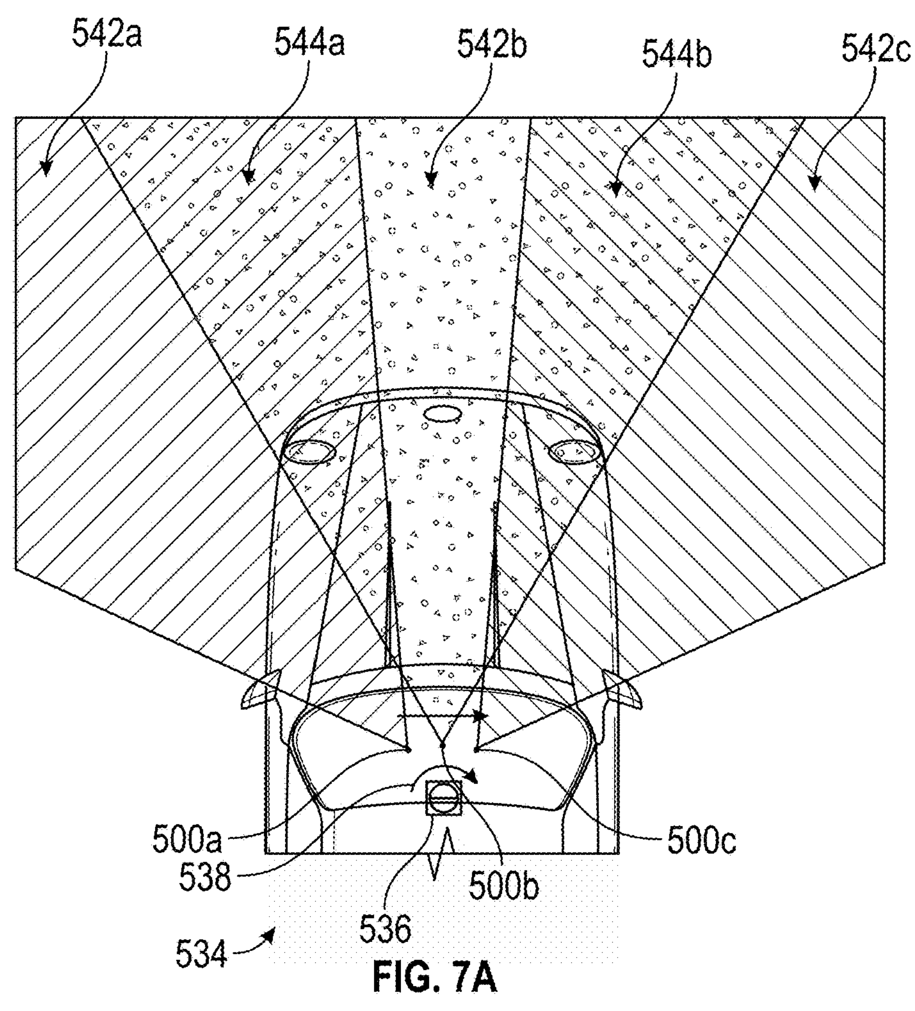
FIG. 7A is top view of an embodiment of a vehicle including three imaging devices in a first orientation and corresponding horizontal fields of view.
Figure 7B:
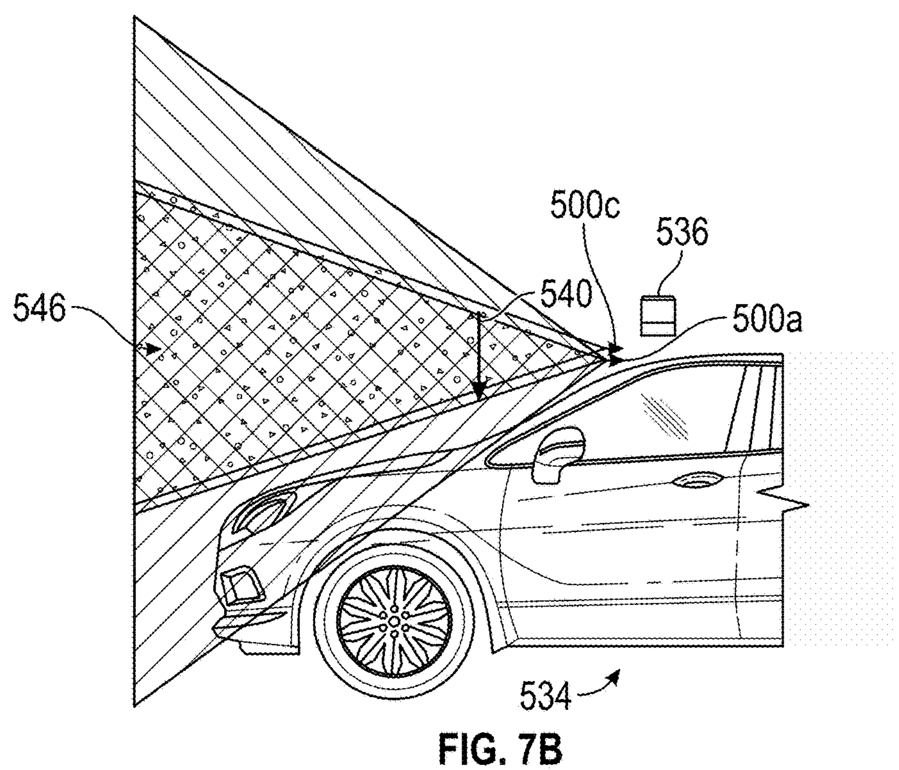
FIG. 7B is a side view of the vehicle and imaging devices in the first orientation illustrated with corresponding vertical fields of view of FIG. 7A.

FIGS. 7A and 7B show three imaging devices 500*a*, 500*b*, 500*c* positioned on an AV 534 (e.g., mounted on a roof of the AV). A LiDAR (light detection and ranging) device 536 is also positioned on the AV 534. The LiDAR device 536 can include a direction of rotation 536 as shown. FIG. 7A shows horizontal fields of view while FIG. 7B shows vertical fields of view.

In the illustrated configuration, the imaging devices 500*a*, 500*b*, 500*c* are positioned in a normal orientation. While three imaging devices 500*a*, 500*b*, 500*c* are shown, any number of imaging devices 500 can be used. For example, one, two, three, or more imaging devices 500. While the three imaging devices 500*a*, 500*b*, 500*c* shown are all positioned in a normal orientation, the imaging devices 500*a*, 500*b*, 500*c* can rotate or otherwise move, as discussed in more detail below, independent of each other. For example, one imaging device 500*a* could be in a normal position while two imaging devices 500*b*, 500*c* are in a position 90 degrees from normal, or any possible combination of orientations. As described herein, a normal position can inherently have a vertical rolling shutter, while a position 90 degrees from normal can inherently have a horizontal rolling shutter.

The LiDAR device 536 can be configured to rotate in the direction shown by arrow 538 in FIG. 7A. The LiDAR device 536 can capture LiDAR images. As discussed above, the imaging devices 500*a*, 500*b*, 500*c* are in a normal orientation and as such the shutter direction is shown by arrow 540 in FIG. 7B.

Each individual imaging device 500*a*, 500*b*, 500*c* can have a corresponding horizontal field of view 542*a*, 542*b*, 542*c*. The horizontal fields of view 542*a*, 542*b*, 542*c* can at least partially overlap as shown by sections 544*a* and 544*b*. The overlap of the individual horizontal fields of view 542*a*, 542*b*, 542*c* can ensure a more complete coverage or a more complete data set being collected by the imaging devices 500*a*, 500*b*, 500*c*. When the imaging devices 500*a*, 500*b*, 500*c* are positioned in a normal orientation there is a greater field of view overlap than if the imaging devices 500*a*, 500*b*, 500*c* were positioned in an orientation 90 degrees from normal. In some embodiments, the normal orientation can provide a field of view overlap of about 1 degree of overlap to about 59 degrees of overlap, or any value in between. However, there is no minimum amount of overlap required and the overlap can be dependent upon the camera or imaging device being used.

Each individual imaging device 500*a*, 500*b*, 500*c* can have a corresponding vertical field of view. As shown in FIG. 7B, the corresponding vertical fields of view 546 can be substantially similar or identical in height.

Figure 7C:
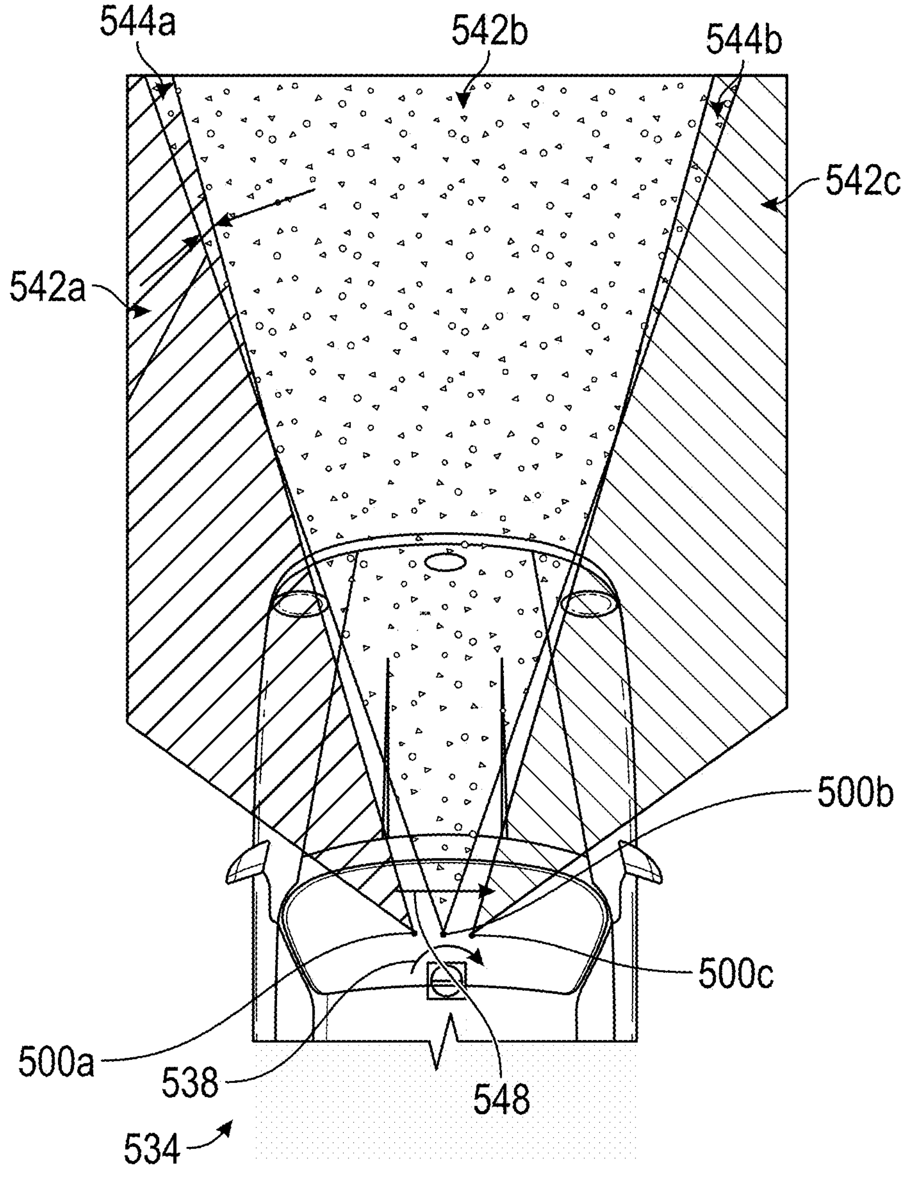
FIG. 7C is top view of the vehicle and imaging devices of FIG. 7A shown with the imaging devices rotated to a second orientation and corresponding horizontal fields of view.
Figure 7D:
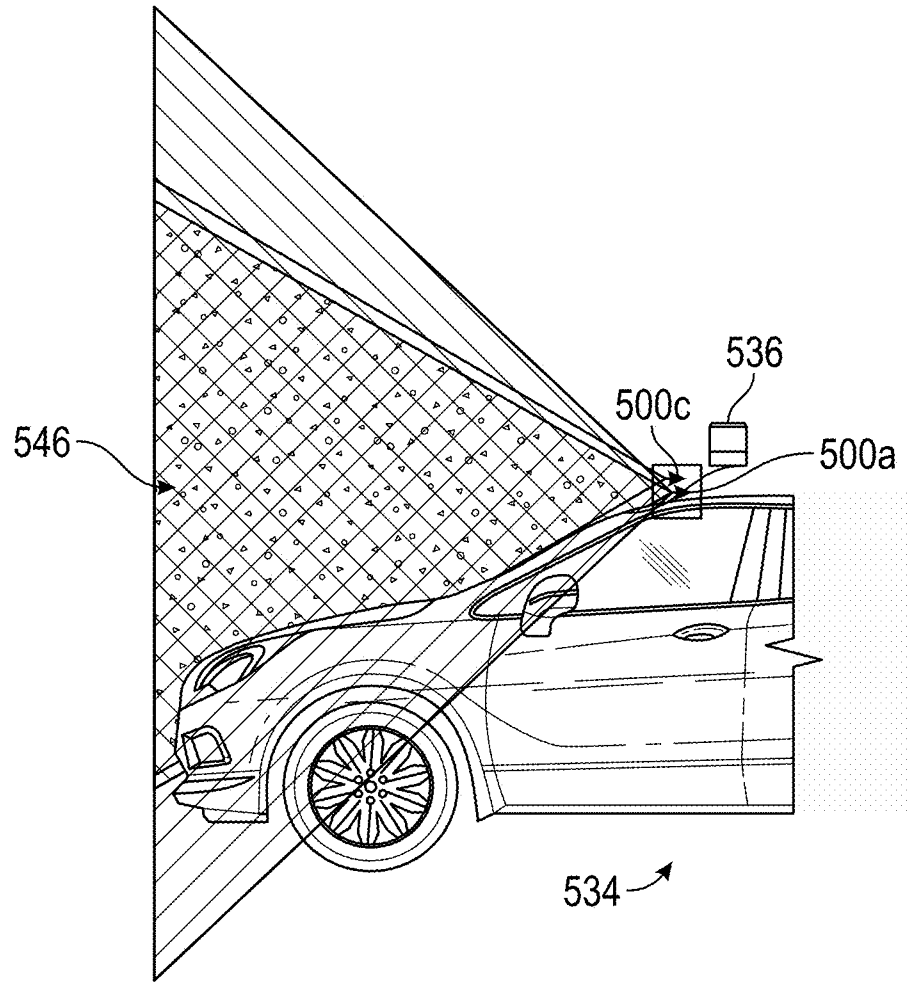
FIG. 7D is side view of the vehicle and imaging devices of FIG. 7C with corresponding vertical fields of view.

FIGS. 7C and 7D show the same AV 534 as shown in FIGS. 7A and 7B, including the imaging devices 500*a*, 500*b*, 500*c* and the LiDAR device 536. FIG. 7C shows horizontal fields of view and FIG. 7D shows vertical fields of view. In the illustrated configuration of FIGS. 7C and 7D, the imaging devices 500 have been rotated to an orientation 90 degrees from normal.

Each individual imaging device 500*a*, 500*b*, 500*c* can have a corresponding horizontal field of view 542*a*, 542*b*, 542*c*. The horizontal fields of view 542*a*, 542*b*, 542*c* can at least partially overlap as shown by sections 544*a* and 544*b*. As compared to FIG. 7A, the overlapping horizontal field of view sections 544*a*, 544*b* are smaller in FIG. 7C. This is due to the positioning of the imaging devices 500*a*, 500*b*, 500*c*. As described herein, the imaging devices 500*a*, 500*b*, 500*c* have rotated from a normal orientation in FIG. 7A to an orientation 90 degrees from normal in FIG. 7C. This results in a smaller overlap of the horizontal fields of view. This configuration can provide a field of view overlap of about 1 degree of overlap to about 38 degrees of overlap, or any value in between. The overlap can be dependent upon the camera or imaging device being used and as such can be outside the exemplary range if required by the camera or imaging device.

Further, The LiDAR device 536 can be configured to rotate in the direction shown by arrow 538 in FIG. 7C. As mentioned, the imaging devices 500*a*, 500*b*, 500*c* are in an orientation 90 degrees from normal and as such the shutter direction is shown by arrow 548 in FIG. 7C. As such, the rolling shutter has also transitioned from a vertical rolling shutter to a horizontal rolling shutter. In this configuration, the shutter direction is substantially aligned with the direction of rotation of the LiDAR system which can facilitate correlating the datasets from each as described above.

Each individual imaging device 500*a*, 500*b*, 500*c* can have a corresponding vertical field of view. As shown in FIG. 7D, the corresponding vertical fields of view 546 can be substantially similar or identical in height. The vertical field of views 546 shown in FIG. 7D can be larger than the vertical fields of view 546 shown in FIG. 7B.

Figure 8A:
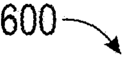
FIG. 8A is an example embodiment of a multiple position rolling shutter imaging system in a first orientation.
Figure 8A:
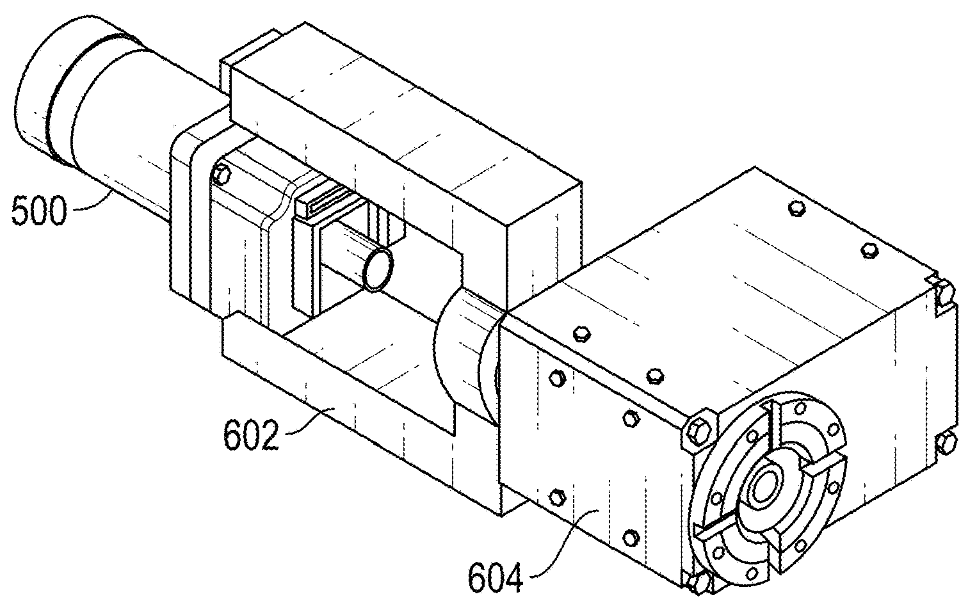
Figure 8B:
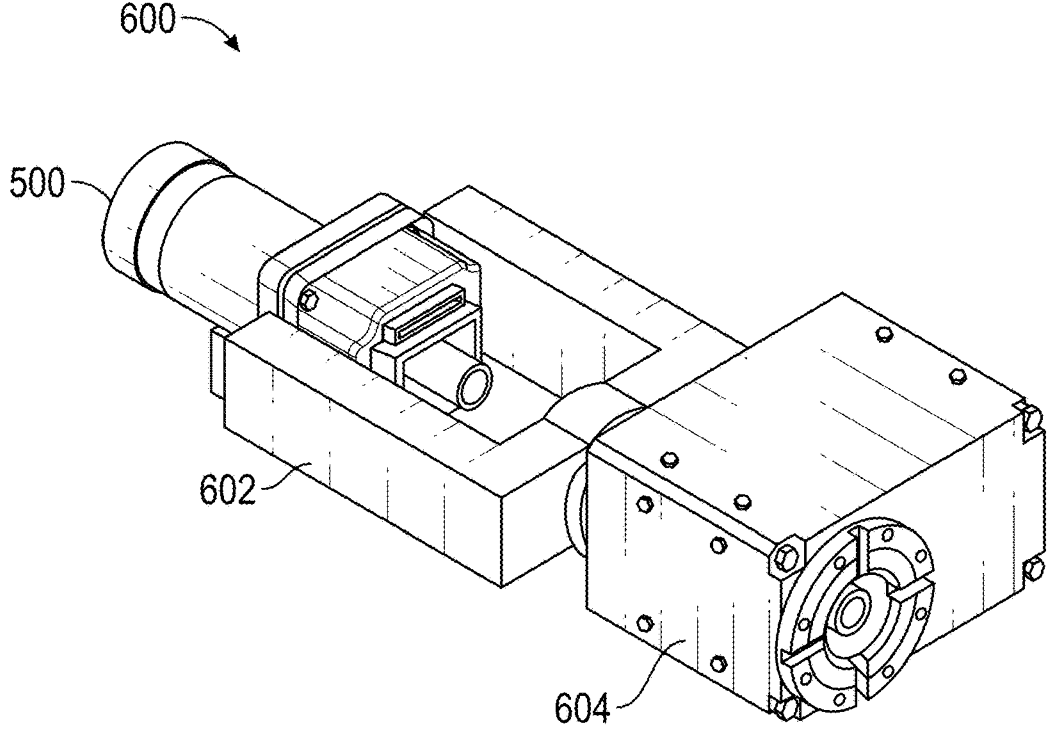
FIG. 8B illustrates the multiple position rolling shutter imaging system in a second orientation that is rotated about 90 degrees from the first orientation.

FIGS. 8A and 8B show an embodiment of a multiple position rolling shutter system 600. The system 600 can include the imaging device 500, a connector 602, and an actuator 604. The imaging device 500 can be, for example, a camera assembly including one or more lenses and an image sensor. In some embodiments, the imaging device 500 can be an image sensor. The connector 602 is configured to receive the imaging device 500. For example, the imaging device 500 can be fixedly connected to the connector 602. The connector 602 is also rotatably attached to the actuator 604 such that the actuator can rotate the imaging device 500 between two or more orientations. The actuator 604 can be, for example, an electric motor, such as a stepper motor, although other actuators can also be used.

In some embodiments, the system 600 can include at least one processor and at least on non-transitory storage media. The non-transitory storage media can store instructions that when executed by the processor can cause the processor to cause the actuator 604 to rotate the imaging device 500. As described herein, the system 600 can be used in connection with an AV and a LiDAR device. An AV can utilize more than one system 600 at a time. For example, as shown and described with reference to FIGS. 7A-7D, multiple systems 600 can be attached to the AV.

FIG. 8A shows the imaging device 500 in a normal orientation. FIG. 8B shows the imaging device 500 in an orientation 90 degrees from normal. The imaging device 500 can be configured to capture an image within a field of view using a rolling shutter that operates in a shutter direction as described herein. The field of view and the shutter direction can be varied by rotating the imaging device 500 with the actuator 604.

The connector 602 can rotatably couple the imaging device 500 to the actuator 604. The connector 604 can be coupled at a first end to the actuator 604. The connector 604 can be coupled at a second end to the imaging device 500. In some embodiments, the connector 602 can be coupled to the imaging device 500 at two connection points, as shown in FIGS. 8A and 8B. The connector 602 can be coupled to the imaging device 500 at a single connection point. The connector 602 can have a general U-Shape. The connector 602 can be a single segment or rod, for example, having a single connection point with the imaging device 500 and a single connection point with the actuator 604. The connector 602 can be configured to rotate with the imaging device 500. The connector 602 can be configured to be stationary relative to the imaging device 500.

Figure 8C:
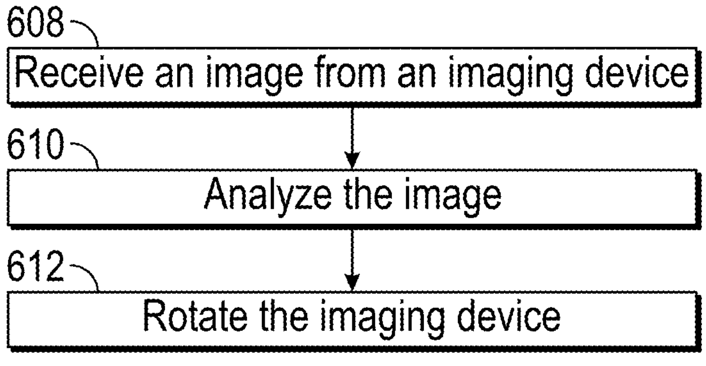
FIG. 8C is an example method for controlling the multiple position rolling shutter imaging system of FIGS. 8A and 8B.

The actuator 604 can be configured to rotate the connector 602 and the imaging device 500. In some embodiments, the actuator 604 can be a motor. For example, with reference to FIG. 8C, starting at block 608 an image can be received from the imaging device 500 using the at least one processor. Moving to block 610, the image can be analyzed using the processor to determine at least one image parameter. Moving to block 612, in response to the analysis conducted at 610, the imaging device can be rotated. For example, the actuator 604 can rotate the imaging device 500 and/or the connector 602 between a first and second orientation. For example, a first orientation as shown in FIG. 8A, and a second orientation as shown in FIG. 8B. However, the first orientation can be any orientation, for example, a normal orientation as shown, an orientation 90 degrees from normal, or an orientation any number of degrees from normal. Further, the second orientation can be any orientation, for example, an orientation 90 degrees from normal as shown, a normal orientation, or an orientation any number of degrees from normal. The image being analyzed can be used to infer the speed of objects in the image plane by analyzing the motion blur and skewness of objects. This information can then be used in the overall decision making of whether rotation should be triggered.

The first orientation can have a shutter direction in a first direction. The second orientation can have a shutter orientation in a second direction. The first direction can be different than the second direction. For example, the first direction can be a vertical rolling shutter, while the second direction can be a horizontal rolling shutter or vice versa.

In some embodiments, the rotation of the imaging device 500 can be based or triggered at least in part on a predetermined threshold value or criteria. For example, rotation of the imaging device 500 can be in response to a confidence level, a comparison between the image captured from the imaging device as compared to LiDAR data, a height and/or width of an object detected, and if the ground is visible. The decision to rotate the imaging device 500 can be automatic. In some embodiments, the decision to rotate the imaging device 500 can be made by a user, for example, by a driver. In some embodiments, the decision to rotate the imaging device 500 can be made by a remote vehicle assistance.

In some embodiments, rotation can be triggered based on the computation of intersection over union (IOU) between an object in the camera image and the corresponding LiDAR points projected on to the image. If the IOU is close to one the correlation indicates that no rotation is needed. If the IOU is less than one or begins to deteriorate a rotation of the camera or imaging device can be triggered in an attempt to improve the IOU.

In some embodiments, the processor can be configured to detect an object with the LiDAR image. The processor can cause the actuator 604 to rotate the imaging device 500 between the first orientation and second orientation based on determining a difference between a shape of the object detected within the image from the imaging device 500 and the shape of the object detected within the LiDAR image. This rotation can be triggered by the difference exceeding a pre-determined threshold. For example, by considering the IOU as described above.

In some embodiments, the processor can be configured to cause the actuator 604 to rotate the imaging device 500 between the first and second orientation based on determining that the object extends beyond the field of view of the imaging device 500.

Other instances that may trigger a rotation of the imaging device 500 include the detection of discrepancy in data between the imaging device 500 and the LiDAR. In this instance the imaging device can be rotated to see if the data correlation improves. This might be triggered when high velocity objects are detected.

Other situations include, when the objects to be detected are close to the vehicle and moving quickly. It may be necessary to have all imaging devices in horizontal rolling shutter orientations to be able to fully capture the object. Examples that could trigger this situation include a vehicle cut-in or cross-traffic.

An example situation where a vertical rolling shutter would be beneficial is when there are close, slow moving objects that would occupy the overlap region of two imaging devices 500 at the same time. A vertical rolling shutter would allow for better image stitching.

Figures 9A, 9B:
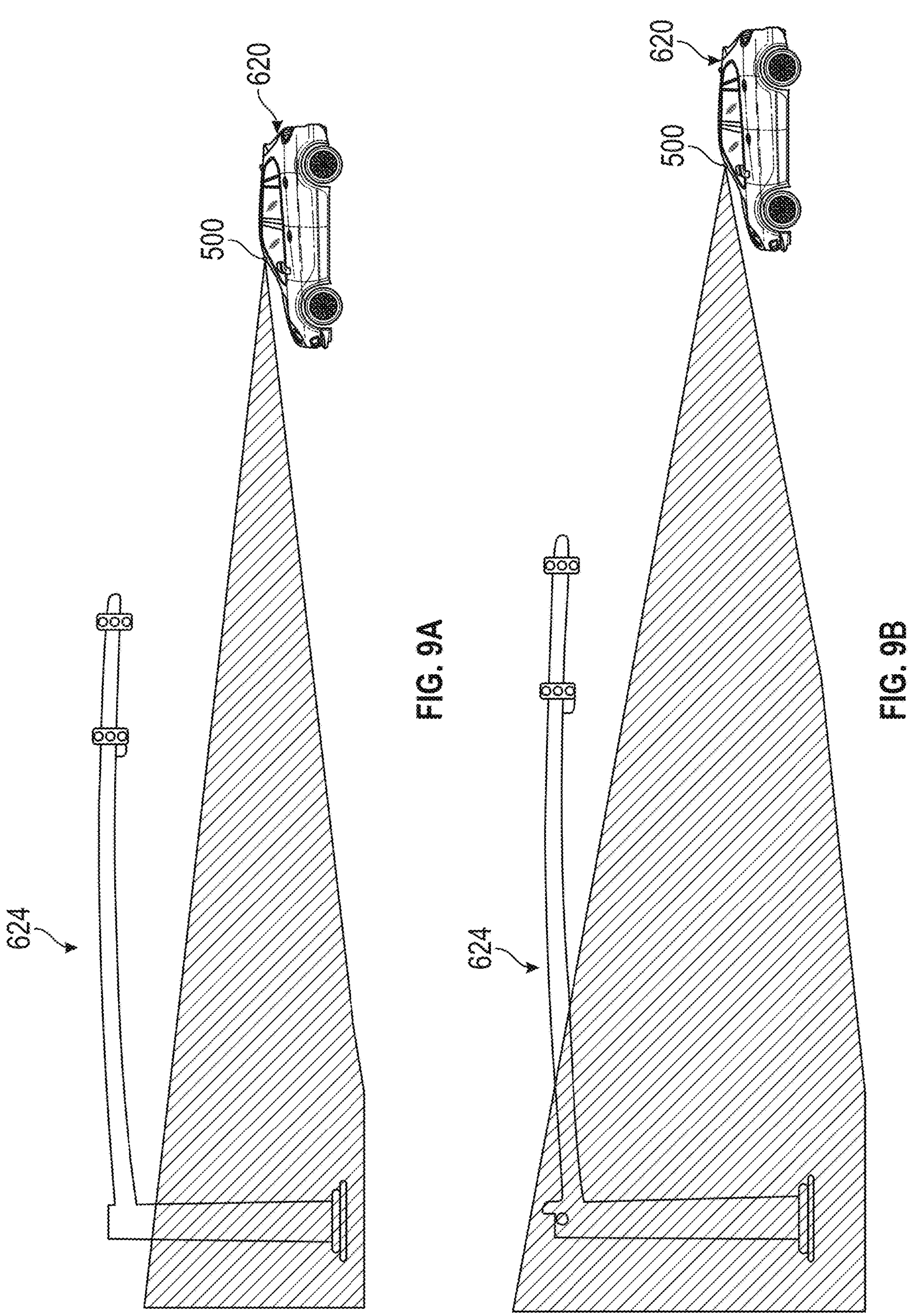
FIG. 9A is a diagram illustrating a vehicle having a multiple position rolling shutter imaging system positioned in a first orientation and a corresponding a vertical field of view.
FIG. 9B is a diagram illustrating the vehicle and imaging system of FIG. 9A with the imaging system positioned in a second orientation and a corresponding vertical field of view.

FIGS. 9A and 9B show vertical fields of view and provide an example as to when it may be necessary to rotate an imaging device (e.g., imaging device 500) from a normal orientation to an orientation 90 degrees from normal. FIG. 9A shows a vertical field of view representative of an imaging device in a normal orientation. FIG. 9B shows a vertical field of view representative of an imaging device in an orientation 90 degrees from normal.

As shown in FIG. 9A the AV 620 is approaching a traffic light 624. The vertical field of view of the imaging device 500 does not reach the top of the traffic light 624. In this instance, the imaging device 500 can be rotated, as described herein, to an orientation 90 degrees from normal. As shown in FIG. 9B, the imaging device 500 has been rotated to an orientation 90 degrees from normal. The vertical field of view now reaches the top of the traffic light 624. This is one example of a situation where it may be necessary to rotate the positioning of the imaging device 500. While the scenario depicted illustrates the need for varying vertical fields of view, a similar situation can arise where it may be necessary to rotate the imaging device 500 to allow for a wider or narrower horizontal field of view.

As described herein, a normal orientation and an orientation 90 degrees from normal offer various advantages and benefits. The adjustability of the field of view (both vertical and horizontal) offers many advantages. For example, a normal orientation provides more horizontal field of view overlap between multiple imaging devices which can allow for better stitching of images. For example, an orientation 90 degrees from normal provides a taller vertical field of view which can allow for better coverage of taller objects.

The adjustability of the direction of the rolling shutter (vertical and horizontal) also offers many advantages. For example, the vertical rolling shutter allows for temporally closer edges of the images taken for easier stitching. This is because the same row in both images are exposed at the same time. For example, the horizontal rolling shutter allows for better overlap with the LiDAR data.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Various additional example embodiments of the disclosure can be described by the following clauses:

Clause 1: A system, comprising:

an imaging device configured to capture an image within a field of view using a rolling shutter that operates in a shutter direction;

a connector coupled to the imaging device;

an actuator coupled to the connector, the actuator configured to rotate the connector and the imaging device between:

a first orientation, wherein the shutter direction comprises a first direction, and a second orientation, wherein the shutter direction comprises a second direction that is different than the first direction;

at least one processor; and at least one non-transitory storage media storing instructions that, when executed by the at least one processor, cause the at least one processor to cause the actuator to rotate the imaging device between the first orientation and the second orientation based on an analysis of the image.

Clause 2: The system of Clause 1, wherein the field of view of the imaging device is asymmetric.

Clause 3: The system of Clause 1 or 2, wherein the first direction is orthogonal to the second direction.

Clause 4: The system of Clause 3, wherein the first direction is a vertical direction and the second direction is a horizontal direction.

Clause 5: The system of any one of Clauses 1 to 4, further comprising a light detection and ranging (LiDAR) system configured to capture a LiDAR image, and wherein the at least one processor is configured to:

detect an object within the image from the imaging device;

detect the object within the LiDAR image; and cause the actuator to rotate the imaging device between the first orientation and the second orientation based on determining that a difference between a shape of the object detected within the image from the imaging device and a shape of the object detected within the LiDAR image exceeds a threshold.

Clause 6: The system of any one of Clauses 1 to 5, wherein the at least one processor is configured to:

detect an object within the image; and cause the actuator to rotate the imaging device between the first orientation and the second orientation based on determining that the object extends beyond the field of view of the imaging device.

Clause 7: The system of any one of Clauses 1 to 6, wherein the rotation is in response to a pre-determined threshold value.

Clause 8: The system of Clause 7, wherein the pre-determined threshold value is a level of confidence.

Clause 9: A method comprising:

receiving, using at least one processor, an image from an imaging device configured to capture an image within a field of view using a rolling shutter that operates in a shutter direction, wherein the imaging device is coupled to an actuator configured to move the imaging device between a first orientation, wherein the shutter direction comprises a first direction, and a second orientation, wherein the shutter direction comprises a second direction that is different than the first direction;

analyzing, using the at least one processor, the image to determine at least one image parameter; and causing, using the at least one processor, the actuator to rotate the imaging device between the first orientation and the second orientation based on the at least one image parameter.

Clause 10: The method of Clause 9, wherein rotating the imaging device is based at least in part on a pre-determined threshold value.

Clause 11: The method of Clause 10, wherein the pre-determined threshold value is a level of confidence.

Clause 12: The method of any one of Clause 9 to 11, further comprising:

detecting an object within the image received from the imaging device;

detecting the object within a LiDAR image received from a LiDAR system; and causing the actuator to rotate the imaging device between the first orientation and the second orientation based on determining that a difference between a shape of the object detected within the image from the imaging device and a shape of the object detected within the LiDAR image exceeds a threshold.

Clause 13: The method of any one of Clause 9 to 12, further comprising:

detecting an object within the image; and causing the actuator to rotate the imaging device between the first orientation and the second orientation based on determining that the object extends beyond a field of view of the imaging device.

Clause 14: An apparatus, comprising:

an imaging device comprising a field of view that is asymmetric, the field of view comprising a first dimension that is less than and orthogonal to a second dimension, the imaging device configured to capture an image within the field of view using a rolling shutter that operates in a shutter direction that is parallel to the first dimension;

a connector coupled to the imaging device; and an actuator coupled to the connector, the actuator configured to rotate the connector and the imaging device between:

a first orientation, wherein the first dimension is parallel to a first direction, and a second orientation, wherein the first dimension is parallel to a second direction that is orthogonal to the first direction.

Clause 15: The apparatus of Clause 14, wherein the first orientation is about 90 degrees different than the second orientation.

Clause 16: The apparatus of Clauses 14 or 15, wherein:

the first direction is a vertical direction and the second direction is a horizontal direction, in first orientation, the shutter direction is parallel to the vertical direction, and in the second orientation, the shutter direction is parallel to the horizontal direction.

Clause 17: The apparatus of any one of Clauses 14 to 16, wherein the imaging device comprises a camera.

Clause 18: The apparatus of any one of Clauses 14 to 17, wherein the actuator comprises an electric motor.

Clause 19: The apparatus of any one of Clauses 14 to 18, wherein the rotation is in response to a pre-determined threshold value.

Clause 20: The apparatus of Clause 19, wherein the pre-determined threshold value is a level of confidence.

What is claimed is:

1. A system, comprising:

an imaging device configured to be coupled to an autonomous vehicle, the imaging device configured to capture an image within a field of view using a rolling shutter that operates in a shutter direction;

a connector coupled to the imaging device;

an actuator coupled to the connector, the actuator configured to rotate the connector and the imaging device between:

a first orientation comprising one of a horizontal shutter direction and a vertical shutter direction, and a second orientation comprising the other of the horizontal shutter direction and the vertical shutter direction;

a light detection and ranging (LiDAR) system configured to be coupled to the autonomous vehicle, the LiDAR system configured to capture a LiDAR image, wherein the image captured by the imaging device and the LiDAR image are captured at substantially the same point in time; and at least one processor configured to compare the image captured by the imaging device and the LiDAR image and cause the actuator to rotate the imaging device between the first orientation and the second orientation based on determining that a difference between a shape of an object in the image captured by the imaging device and a shape of the object in the LiDAR image exceeds a pre-determined threshold value.

2. The system of claim 1, wherein the field of view of the imaging device is asymmetric.

3. The system of claim 1, wherein the at least one processor is configured to:

detect an object within the image; and cause the actuator to rotate the imaging device between the first orientation and the second orientation based on determining that the object extends beyond the field of view of the imaging device.

4. The system of claim 1, wherein the pre-determined threshold value is a level of confidence.

5. A method comprising:

receiving, using at least one processor, an image from an imaging device coupled to an autonomous vehicle, the imaging device configured to capture an image within a field of view using a rolling shutter that operates in a shutter direction, wherein the imaging device is coupled to an actuator configured to rotate the imaging device between a first orientation and a second orientation, the first orientation comprising one of a horizontal shutter direction and a vertical shutter direction and the second orientation comprising the other of the horizontal shutter direction and the vertical shutter direction;

receiving, using the at least one processor, a LiDAR image from a LiDAR system coupled to the autonomous vehicle, wherein the image captured by the imaging device and the LiDAR image are captured at substantially the same point in time;

comparing, using the at least one processor, the image from the imaging device and the LiDAR image to determine a difference between a shape of an object in the image from the imaging device and a shape of the object in the LiDAR image; and causing, using the at least one processor, the actuator to rotate the imaging device between the first orientation and the second orientation when the difference exceeds a pre-determined threshold value.

6. The method of claim 5, wherein the pre-determined threshold value is a level of confidence.

7. The method of claim 5, further comprising:

detecting an object within the image; and causing the actuator to rotate the imaging device between the first orientation and the second orientation based on determining that the object extends beyond a field of view of the imaging device.

8. An apparatus, comprising:

a light detection and ranging (LiDAR) system configured to be coupled to an autonomous vehicle, the LiDAR system configured to capture a LiDAR image;

an imaging device configured to be coupled to the autonomous vehicle, the imaging device comprising a field of view that is asymmetric, the field of view comprising a first dimension that is less than and orthogonal to a second dimension, the imaging device configured to capture an image within the field of view, wherein the image captured by the imaging device and the LiDAR image are captured at substantially the same point in time;

a connector coupled to the imaging device; and an actuator coupled to the connector, the actuator configured to rotate the connector and the imaging device between a first orientation and a second orientation based on an identified difference between a shape of an object in the image captured by the imaging device and a shape of the object in the LiDAR image exceeding a pre-determined threshold value, wherein:

the first orientation comprises one of a horizontal shutter direction and a vertical shutter direction, and the second orientation comprises the other of the horizontal shutter direction and the vertical shutter direction.

9. The apparatus of claim 8, wherein the first orientation is about 90 degrees different than the second orientation.

10. The apparatus of claim 8, wherein the imaging device comprises a camera.

11. The apparatus of claim 8, wherein the actuator comprises an electric motor.

12. The apparatus of claim 8, wherein the pre-determined threshold value is a level of confidence.

* * * * *